United States Patent [19]

Savoca et al.

[11] Patent Number: 4,791,297
[45] Date of Patent: Dec. 13, 1988

[54] YAW SENSING CONICAL SCANNER HORIZON SENSOR

[75] Inventors: Robert C. Savoca, Ridgefield; Gerald Falbel, Stamford, both of Conn.

[73] Assignee: Barnes Engineering Company, Shelton, Conn.

[21] Appl. No.: 31,436

[22] Filed: Mar. 26, 1987

[51] Int. Cl.$^4$ ............................................. G01J 5/08
[52] U.S. Cl. .................................. 250/347; 250/342; 250/353; 356/152
[58] Field of Search ............... 250/353, 351, 347, 342; 356/141, 152; 244/3.16, 171; 364/459, 434

[56] References Cited

U.S. PATENT DOCUMENTS

| 3,020,407 | 2/1962 | Merlen | 250/347 |
| 3,658,427 | 4/1972 | DeCou | 356/152 |
| 4,328,421 | 5/1982 | Falbel | 250/347 |

FOREIGN PATENT DOCUMENTS 1464783  11/1966  France ................. 250/353

Primary Examiner—Janice A. Howell
Assistant Examiner—Constantine Hannaher
Attorney, Agent, or Firm—Parmelee, Bollinger & Bramblett

[57] ABSTRACT

A radiation detector is scanned over two fan fields of view by first and second cylindrical lenses spaced about the axis of rotation of a common optical element positioned on the axis of rotation. The optical element is rotated about the optical axis by a motor or the rotation of the orbiting body on which the scanner is mounted. In one form the common optical element is a chisel mirror having the first and second cylindrical lenses positioned on opposite sides thereof and tilted at an angle of 45° with respect to the axis of rotation producing two fan fields which are 180° apart in phase. As an alternative the common optical element may comprise a cylinder having the second cylindrical lens positioned along with a bevelled reflective upper surface for producing a vertical fan field. The cylindrical lenses and common optical element may be incorporated in a conical scanner employing an infrared detector which systems can be combined to produce yaw, pitch, roll, attitude information in a single horizon sensor head.

13 Claims, 4 Drawing Sheets

YAW SENSING CONICAL SCANNER HORIZON SENSOR

BACKGROUND OF THE INVENTION

This invention relates to scanning sensors for determining attitude information for an orbiting body, and more particularly, to a yaw sensing conical scanner which can be used and combined with a conical sensor for providing three axes attitude information using a single horizon sensor head.

Horizon sensors are devices mounted on an orbiting body such as satellites, missiles, space probes, extremely high flying aircraft and the like which sense the horizon of a reference body and produce a signal which indicates orientation of the orbiting body with respect to the reference body. The attitude of the orbiting body which generally orbits the earth and is determined by its position with respect to three axes at right angles to each other, two of which are in a plane at right angles to a projected radius of the earth passing through the orbiting body which plane is parallel to the earth's horizon. Conical scan horizon sensors are frequently used in space craft to determine pitch and roll attitude by sensing the position of the earth's horizon in several directions. The third axis called yaw is the attitude around an axis through the center of the earth which cannot be obtained from horizon data and observations of some other celestial object or body, usually the sun are required. The problem in providing the various attitude information including yaw normally requires extra equipment or different sensor heads which are both costly, require increased power and add weight, all of which are undesirable.

SUMMARY

Accordingly, it is an object of this invention to provide a new and improved system for determining attitude information for an orbiting body which employs a single conical scanner for providing three axes attitude information.

A further object of this invention is to provide a new and improved horizon sensor which provides yaw attitude information by means of a simple variation of a conical scan sensor.

Another object of this invention is to provide a new and improved horizon sensor providing phase shifted fan fields for acquiring the sun and producing information for determining the yaw attitude of an orbiting body.

Still another object of this invention is to provide a new and improved horizon sensor utilizing a conical scan sensor which is modified to provide yaw sensing.

Another object of this invention is to provide a composite horizon sensor having a visible light channel which is utilized to indicate that the sun is in the field of the view of the IR detector portion of the system.

Still another object of this invention is to provide a yaw sensing scanner in combination with a dual field conical horizon sensor for producing three axes information.

A further object of this invention is to provide a system utilizing an infrared detector for sensing yaw as well as pitch and roll attitude information.

Still another object of this invention is to provide a new and improved horizon sensor which provides fan scan fields which are not required to be 180° out of phase in order to accommodate mounting on certain types of orbiting bodies.

Another object of this invention is to provide a unitary single conical scan horizon sensor utilizing a combination of optical elements which are rotated about a common axis for providing three axes attitude information and which may be scanned by the spinning action of the orbiting body itself.

In carrying out this invention in one illustrative embodiment thereof, a system is provided for determining attitude information for an orbiting body which has an objective lens for imaging a field of view onto a detector for detecting radiation. A scanner is provided for the detector having an optical axis of rotation which includes a first and second cylindrical lens spaced about the axis of rotation along with a common optical means positioned on the axis of rotation for splitting the detector field of view into two fields, one from the first and one from the second cylindrcal lens which fields are normal to the axis of rotation and separated in phase. The scanner is rotated by a motor driven shaft or the rotation of the orbiting body about the axis of rotation for scanning the detector across a celestial body and producing celestial signals which are used to determine the yaw attitude of the orbiting body.

In one form the scanner includes a chisel mirror having the first and second cylindrical lenses positioned on opposite sides thereof and tilted at an angle of 45° with respect to the axis of rotation for producing two fan fields of view which are 180° apart. In another form, the common optical means comprises a cylinder containing a beam splitter with the second lens positioned along with a bevelled reflective upper surface for directing the vertical field of view of the second cylindrical lens along the axis of rotation to the detector thus producing one vertical fan field. These common optical means may be combined and mounted on a scanning mirror which may be split for providing conical scans of the horizon to provide pitch and roll attitude information along with the yaw information derived from the cylindrical lens fields of view.

Among the many advantages of the present invention is that it adapts itself to a unitary single sensor head embodiment which may utilize in combination with a properly positioned beam splitter and/or filters may use both a light radiation detector and an infrared detector in which case the light detector can also be used to inhibit the infrared detector when the sun appears in the field of view of the infrared detector. In addition, a single infrared detector may be utilized for providing signals for the entire three axes attitude information derived by the sensor head.

BRIEF DESCRIPTION OF THE DRAWINGS

The invention, together with further objects, aspects, features and advantages thereof will be better understood from the following description taken in connection with the accompanying drawings.

DESCRIPTION OF THE PREFERRED EMBODIMENTS

One of the objects of the present invention is to derive yaw attitude information by using a simple modification of a conical scan horizon sensor which will in effect provide the necessary sun observation in order to provide the yaw information. In order to clearly explain the principle the system will first be described in terms of a conical scanner whose only function is to sense the sun or celestial body position. Then it will be shown that this feature can be readily incorporated in a conical scan sensor to provide three axis attitude information namely, pitch, roll, and yaw utilizing a single composite scanner.

Figure 1:
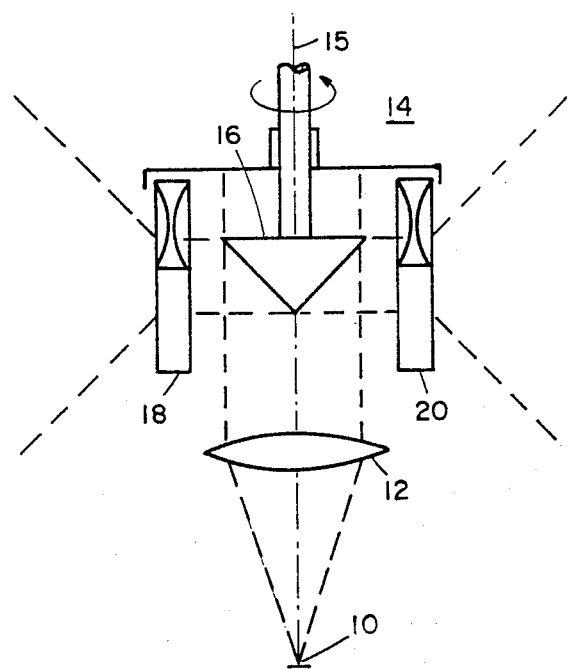
FIG. 1 is a diagrammatic view of a conical scan sensor for providing yaw attitude information in accordance with the present invention.

Referring now to FIG. 1, a conical scan yaw sensor comprises a detector 10, a rotating or stationary objective lens 12 and a coaxial rotating assembly referred to generally with the reference numeral 14 that rotates about an axis of rotation 15. The rotating assembly 14 holds a chisel mirror 16 and a pair of cylindrical lenses 18 and 20, respectively. The facets of the chisel mirror form angles of plus or minus 45° with respect to axis of rotation 15, and the cylindrical lenses are tilted at 45° to the axis of rotation as will best be seen in FIG. 2. The detector 10 can be any type that senses the type of radiation being received.

Figure 2:
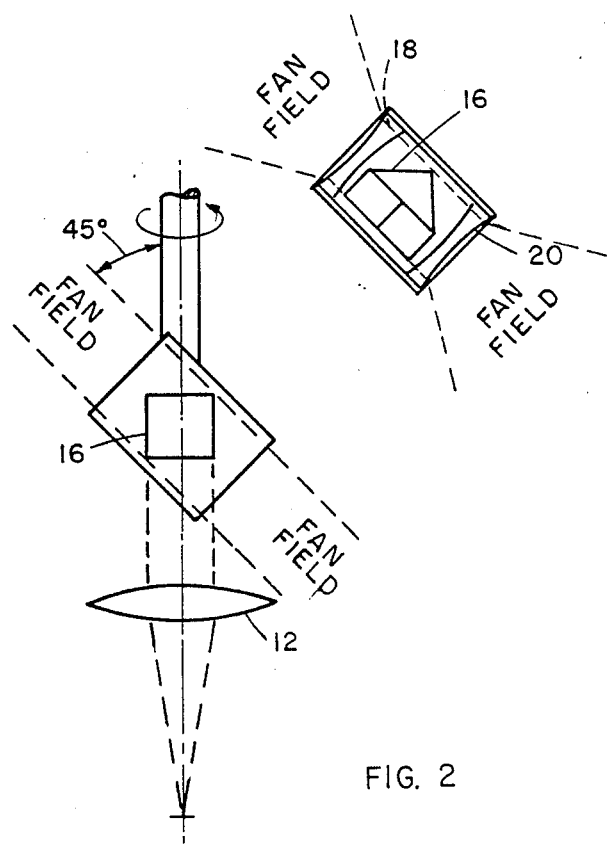
FIG. 2 is a side view of the conical scan yaw sensor illustrated in FIG. 1 including an additional exploded, rotated view of the chisel mirror and cylindrical lenses utilized in the optical scanning system as illustrated in FIGS. 1 and 2.

The optical effect of the arrangement illustrated in FIGS. 1 and 2 provides a detector field which is split into two beams by the chisel mirror 16 which emerge opposite each other and normal to the axis of rotation 15. The two fields of view are spread into fans in a given direction by the cylindrical lenses 18 and 20. Due to the tilt of the cylindrical lenses 18 and 20, the long dimension of the fan fields make an angle of 45° with the axis of rotation 15 as best seen in FIG. 2. In FIG. 2 the fan fields project out or into the paper and extend from the upper left to the lower right.

Figure 3:
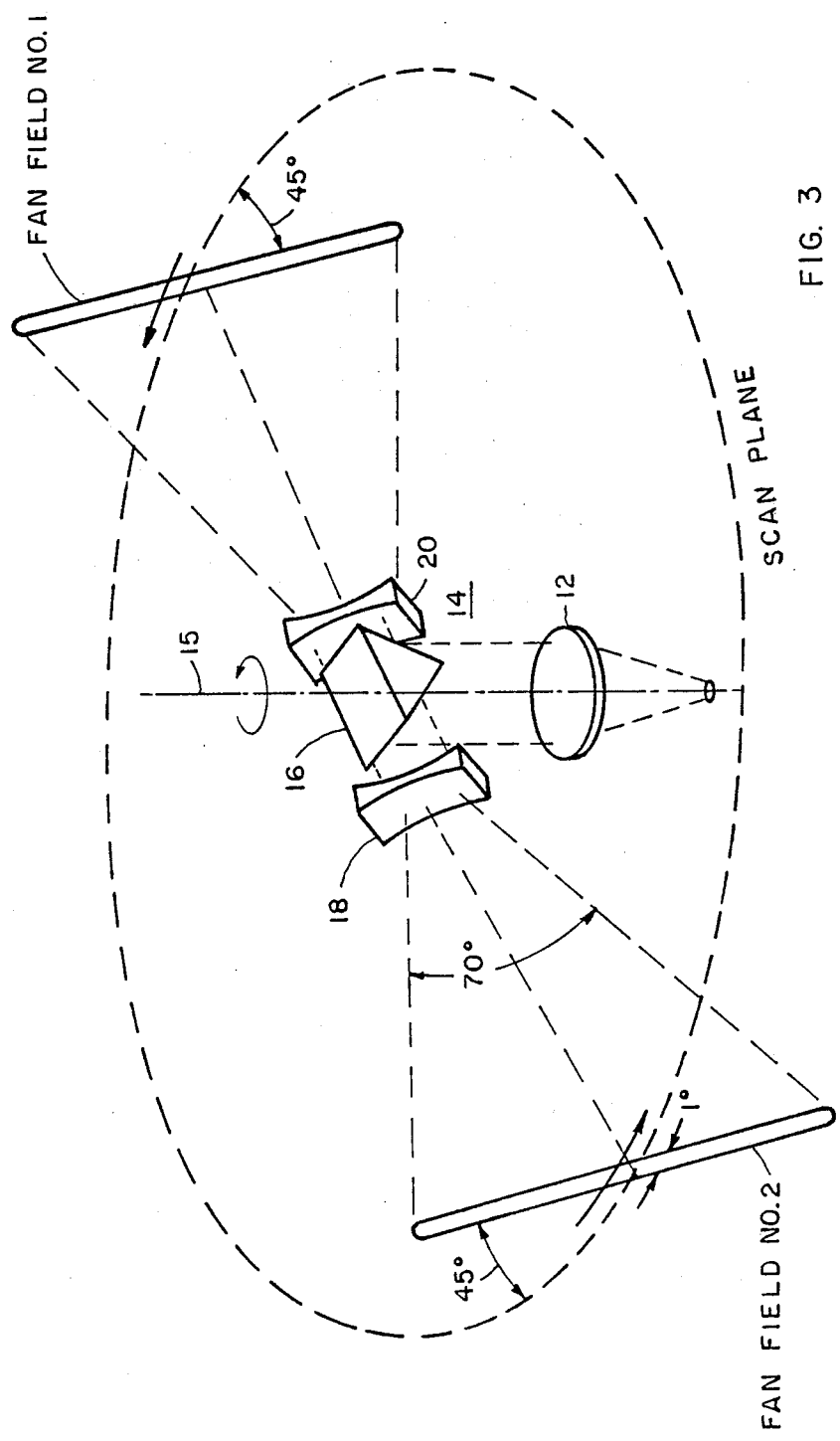
FIG. 3 is a diagrammatic perspective view of the scanner shown in FIGS. 1 and 2 illustrating the fan fields projected out with the center point of the scan forming a great circle normal to the axis of rotation which is the scan plane of the system.

FIG. 3 illustrates in perspective the system with the fan fields which are generally about 1° by 70° projected out to a celestial sphere. The choice of 70° is to allow for the ±23½° season variation in the declination of the sun. The center point of the fan field scans a great circle normal to the axis of rotation 15 which is defined in FIG. 3 as the scan plane. The two fan fields are inclined 45° with respect to the scan plane and sweep out a zone of the celestial sphere. A very important point to note is that although the two fan fields are tilted in the same direction with respect to the rotating assembly 14, the fan fields appear tilted in opposite directions as they scan past a fixed point on the celestial sphere.

Figure 4:
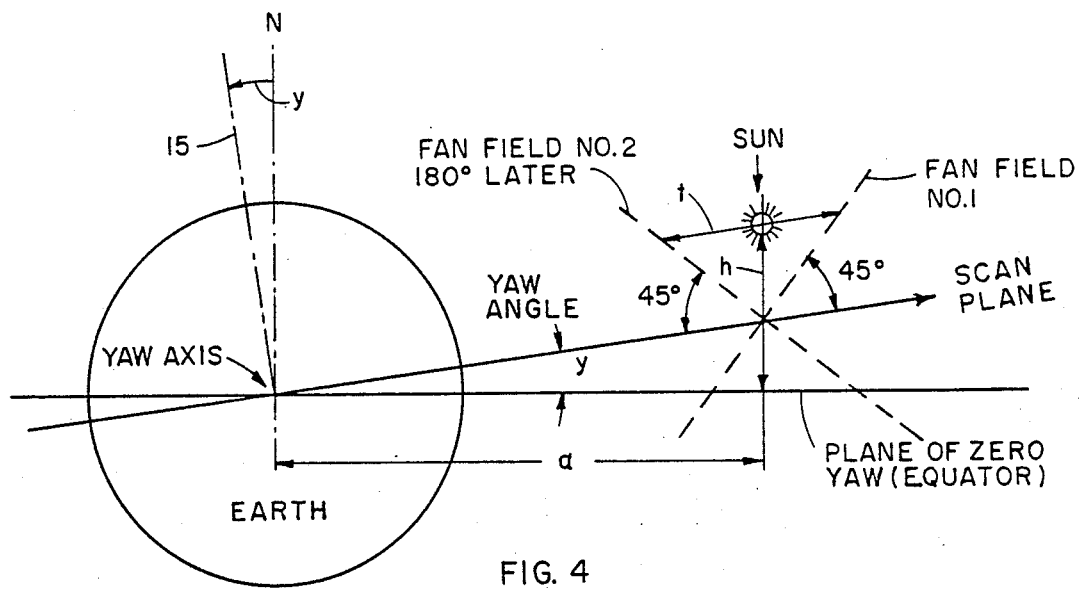
FIG. 4 is a diagrammatic illustration useful to explain how the system is utilized for determining yaw attitude.

FIG. 4 illustrates how the system of FIGS. 1 and 2 is used to determine yaw. A likely application would be for a synchronous altitude satellite in an equatorial orbit in which case with zero yaw, the scan plane would coincide with the equator and the rotational axis 15 of the scanner would coincide with the polar axis of the earth. As shown in FIG. 3, yaw would tilt the scan plane through an angle y. It is assumed that the angular position of the sun with respect to the earth, a and h, are known from ephemeris data. In an equatorial orbit, h is the sun's declination and a the local hour angle.

The two fan fields 1 and 2, are shown passing over the sun. Field #1 is shown tilted 45° toward the upper right. When fan Field #2 passes by 180° of rotation later, it will be tilted toward the upper left as mentioned previously. If the sun lies in the scan plane, the interval between successive sun signals would be exactly 180° of rotation. However, since the fields are tilted in opposite directions, a phase shift occurs when the sun is not in the scan plane. Letting $\phi_1$ be the interval between the sun signal from Fields #1 and #2, and $\phi_2$ being the interval between Field #2 and Field #1, then:

$$\phi_1 + \phi_2 = 360°$$

$$\phi_1 - \phi_2 = \pm t \qquad \text{Eq. 1}$$

The angle t is, therefore, measured by the scanner. If y is assumed a small angle, it is obtained by inspection from FIG. 3 as:

$$y = \frac{h \pm \frac{t}{2}}{a} \qquad \text{Eq. 2}$$

For large values of y, the calculation is more complicated but is completely determined by a, h and t.

Figure 5:
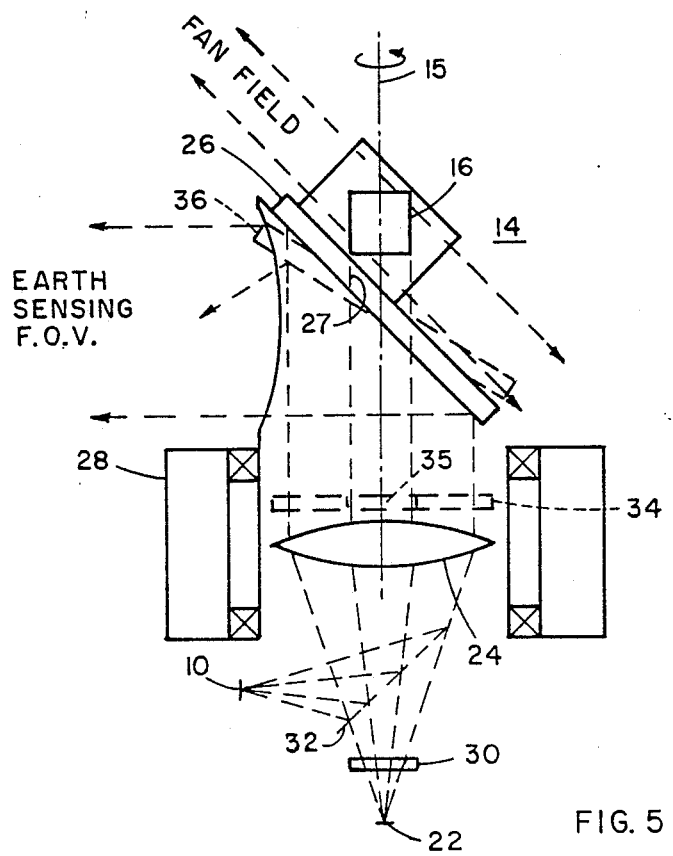
FIG. 5 is a diagrammatic illustration of the yaw system of FIGS. 1 and 2 combined with a conical scan horizon sensor.

FIG. 5 illustrates the yaw measuring system of FIG. 1 combined with a conical scan horizon sensor. The conical scan horizon sensor has an infrared detector 22, for example, a pyroelectric detector, an objective lens 24 transmitting in the required spectral region, and a 45° rotating mirror 26 driven by a hollow shaft motor 28 to scan a great circle. The detector 22 has a field of view of about 2.5° diameter. A carbon dioxide band pass filter 30 is positioned in front of the infrared detector 22 in order to restrict the received radiation of the 14–16 micron $CO_2$ band for blocking radiation radiation from clouds, oceans, which degrade the accuracy. A more complete treatment of the $CO_2$ band sensor may be obtained from U.S. Pat. No. 3,118,063 which is assigned to the Assignee of the present invention.

The yaw feature is combined with the infrared horizon sensor by placing a central hole 27 in the mirror 26 behind which are mounted the chisel mirror 16 and the cylindrical lenses 18 and 20. A dichroic beam splitter 32 illustrated in phantom in FIG. 5 is mounted in the convergent beam supplied by the rotating assembly 14 to reflect visible radiation to the detector 10 while transmitting the infrared radiation through the $CO_2$ filter 30 to the infrared detector 22. The visible light detector 11 may be any type which will detect solar radiation, such as a silicon photodiode. The objective lens 24 must transmit the visible light to the visible detector 10 as well as the infrared radiation to the infrared detector 22. Accordingly, the objective lens must be made of a suitable material which perform these functions for example, zinc selenide. The $CO_2$ band filter 30 is preferably in the position shown in FIG. 5. If however, the $CO_2$ band filter 34 shown in phantom in FIG. 5 is positioned above the objective lens 24, a central clear region 35 must be provided in order to transmit the solar radiation from the chisel mirror 16 to the visible light detector 10.

The central opening 27 in the mirror 26 provides only a small fraction of the aperture area for use for the yaw system. However, this is possible since the solar radiance is much greater than that of the earth, and furthermore the visible photodiodes used for detector 10 are more sensitive than infrared detectors.

Using $CO_2$ band filter 30, the visible light detector 10 uses the same field as the infrared detector 22 in addition to the yaw sensing field in the central region. This produces an added benefit in providing a reliable indication when the sun is in the infrared field which may be used to inhibit the infrared channel and prevent erroneous pitch and roll outputs. The mirror 26 could be split illustrated in phantom by mirror 36, to produce dual infrared fields as is disclosed in copending application entitled "DUAL FIELD CONICAL HORIZON SENSOR" by R. Savoca Ser. No. 031,435 filed Mar. 26, 1987 assigned to the Assignee of the present invention. Accordingly, pitch, roll and yaw data can be obtained from a single scanner. Thus, three axis information can be derived using a single horizon sensor head.

In some applications, it may be desirable to avoid the need for the beam splitter 32 and the additional visible light channel represented by the beam splitter and the light detector 10. In such an arrangement, the infrared detector 22 may be used to sense the sun signals from the chisel mirror. There is not enough radiation from the sun in the 14–16 micron carbon dioxide band to function, however, with the $CO_2$ filter 34 positioned above the objective lens 24, the central transparent region 35 can be used to transmit the wide band solar radiation to the infrared detector which will provide an ample signal level for yaw sensing from the sun.

Figure 6:
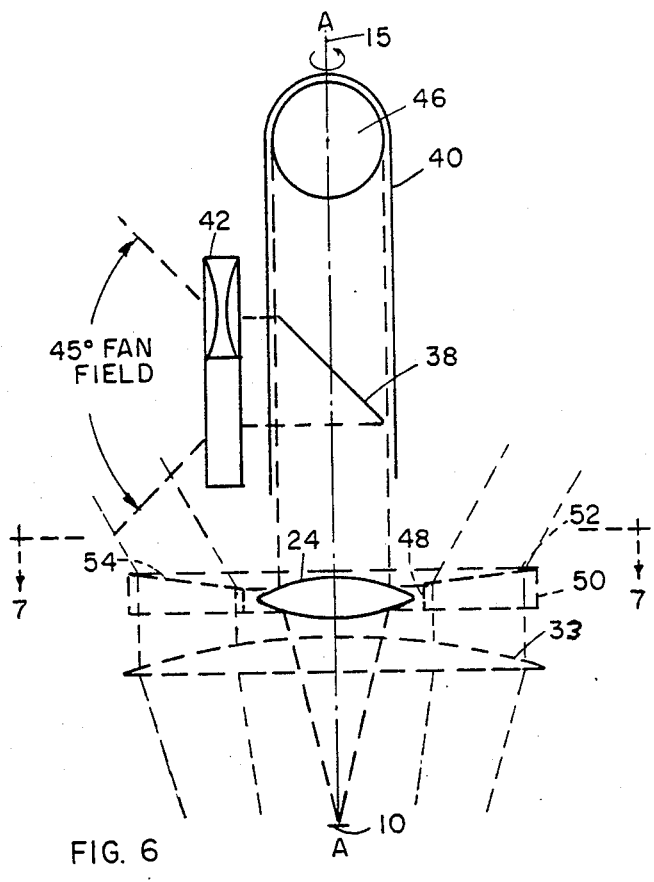
FIG. 6 is a front diagrammatic illustration of an alternative configuration illustrating the conical scan horizon sensor portion in phantom.
Figure 7:
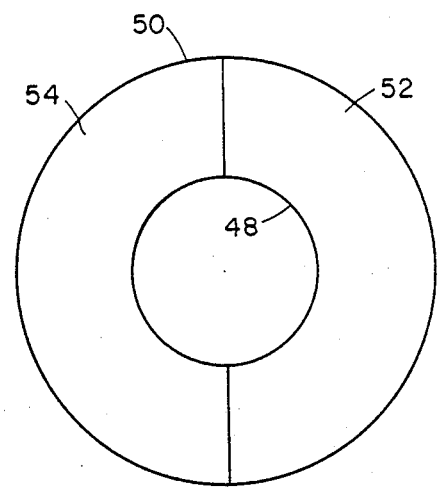
FIG. 7 is a top view taken along line 7—7 in FIG. 6 showing only the split prism.
Figure 8:
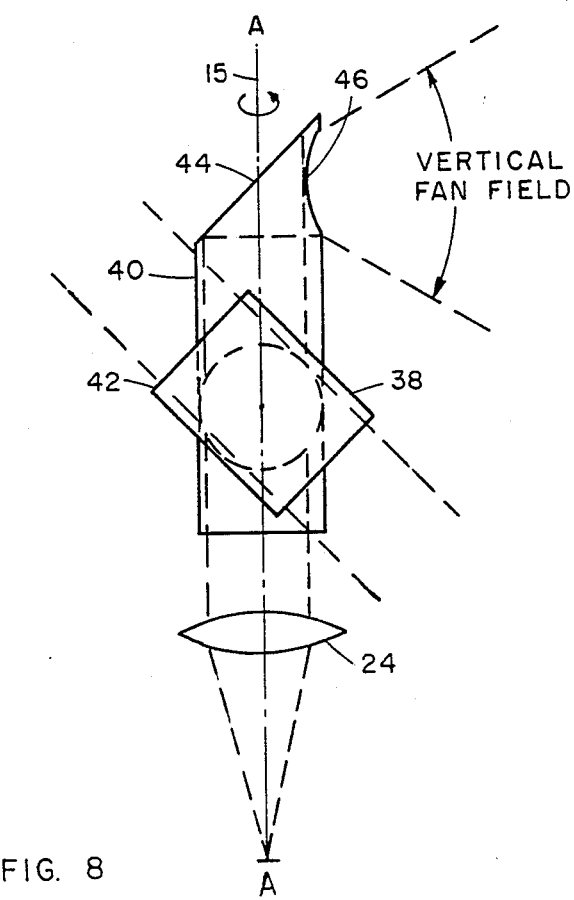
FIG. 8 is a side view of the yaw portion of the system illustrated in FIG. 6.

With the configuration shown in FIGS. 1 and 2, the two fan fields are 180° apart in phase. This wide separation may be inconvenient due to interference from other space craft structure, in which case, the alternate configuration as shown in FIGS. 6 and 7 may be used. In this embodiment the chisel mirror 16 is replaced with a glass cylinder 40 containing a beam splitter 38 directing 50% of the aperture to one of the 45° fan fields from a cylindrical lens 42 which is similar to the previous embodiment as shown in FIG. 1. The remaining portion of the aperture of the visible detector 10 is reflected from a 45° bevel 44 at the top of the glass cylinder 40, and diverged into a vertical fan field by a cylindrical lens 46 ground into the side of the glass cylinder 40. As is shown in FIG. 8, the vertical fan field of the cylindrical lens 46 is aligned with the axis of rotation 15 at a phase angle of 90° with respect to the 45° fan field provided by the cylindrical lens 42. However, the bevel 44 and the cylindrical lens 42 can be placed at any phase angle with respect to the beam splitter 38 to place the vertical fan field at any desired phase displacement with respect to the 45° fan field.

With this configuration, Equation 1 becomes $t = \phi_1 - \phi_2 - \beta$ where $\beta$ is the known phase displacement between the vertical and the 45° fan fields. The angle t is halved because one field is vertical, and Equation 2 becomes:

$$y = \frac{h \pm t}{a} \qquad \text{Eq. 3}$$

The alternative configuration shown in FIG. 6 is also adaptable for modification to be combined with the conical scan horizon sensor. The split mirror arrangement of the aforesaid patent application may be used and another arrangement illustrated in phantom on FIG. 6 as well as others may be employed to combine the yaw feature with a typical conical scan horizon sensor to provide three axes information. In FIG. 7 a prism 50 having facets 52 and 54 thereon with a central opening 48 therein is used with a larger objective lens 23 (see FIG. 6) to modify the embodiment of FIG. 6 to include a conical scanner. Of course, the necessary $CO_2$ filters, dichroic beam splitter, and infrared detector would have to be added in a manner described in connection with FIG. 5.

Accordingly, in accordance with the present invention a basic yaw sensing system is provided using the simple concept of a chisel mirror flanked by two cylindrical lenses scanning a detector over two fan shaped fields to readily provide yaw information. This arrangement can be combined with a conical scan horizon sensor and the signal on the visible light channel of the combined system can be used to indicate when the sun is in the field of the infrared detector and to inhibit the infrared channel. A dual field conical scan horizon sensor can be provided with the yaw portion of the system to provide in a single conical scan system three axis information. In addition, using certain modifications an IR detector can be used for sensing the yaw signals as well as providing pitch and roll information thereby allowing a single detector to generate three axis information. In addition, the system may be modified to utilize a vertical fan field to accommodate those situations whereby the space craft structure might interfere with the scanning arrangement provided by the 180° out of phase fan fields.

Although the object sensed in the fan fields of this invention may preferably for certain applications be the sun, it should be pointed out that the invention is not considered so limited and may be applied to other celestial bodies such as the sun-illuminated earth, moon, or planet or the infrared signal from such objects.

Since other changes and modifications varied to fit particular operating requirements and environments will be apparent to those skilled in the art, the invention is not considered limited to the examples chosen for purposes of illustration, and includes all changes and modifications which do not constitute a departure from the true scope and spirit of this invention as claimed in the following claims and equivalents thereto.

What is claimed is:

1. A system for determining attitude information for a orbiting body comprising:
    a detector for detecting radiation,
    an objective lens for imaging a field of view onto said detector,
    a scanner for said detector having an axis of rotation,
    first and second cylindrical lenses in said scanner spaced about said axis of rotation,
    a common optical means in said scanner positioned on said axis of rotation for splitting the detector field of view into two fields, one from said first and one from said second cylindrical lenses which fields are normal to the axis of rotation and separated in phase,
    rotating means for said scanner for scanning said detector across a celestial body so as to produce radiation signals from said detector which are used to determine the attitude of the orbiting body.

2. The system as claimed in claim 1 in which said common optical means comprises a chisel mirror.

3. The system as claimed in claim 2 in which said first and second cylindrical lenses are positioned on opposite sides of said chisel mirror and tilted at an angle of 45° with respect to the axis of rotation producing two fan fields of view which are 180° apart in phase.

4. The system as claimed in claim 1, wherein said common optical means includes a beam splitter.

5. The system as claimed in claim 4, in which said first cylindrical lens is tilted at an angle of 45° with respect to said axis of rotation producing a 45° fan field viewed through said beam splitter by said detector and said second cylindrical lens aligned with the axis of rotation for producing a vertical fan field viewed through said beam splitter by said detector.

6. The system as claimed in claim 5, wherein said common optical element comprises a radiation transparent cylinder containing said beam splitter,
said cylinder having said second cylindrical lens positioned therein along with a bevelled reflective upper surface for directing the vertical fan field of said second cylindrical lens along the axis of rotation to said detector.

7. The system as claimed in claim 6, in which said beveled reflective upper surface and said first cylindrical lens are separated by a predetermined phase angle about said axis of rotation for displacing said 45° fan field with respect to said vertical fan field.

8. The system as claimed in claim 1, wherein said rotating means comprises the rotation of said orbiting body about said axis of rotation.

9. The system as claimed in claim 1, wherein said system includes:
an infrared detector,
conical scan means incorporated in said common optical means for scanning said infrared detector over a reference body and outer space thereby producing signals from said infrared detector which are used to determine pitch and roll attitude information of the orbiting body.

10. The system as claimed in claim 9, wherein said conical scan means comprises a rotating mirror means having a central hole therein,
said first and second cylindrical lenses and said common optical means mounted with respect to said rotating mirror means such that the detector views said field of view of said first and second cylindrical lenses through said central hole in said rotating mirror means.

11. The system as claimed in claim 9 including optical means for permitting said detector to view the same field as said infrared detector such that an indication is available when the sun is in the field of the infrared detector which may be used to inhibit the infrared detector on such an occurance in order to prevent erroneous pitch and roll outputs.

12. The system as claimed in claim 9, wherein said conical scan field means includes split field means for performing simultaneously concentric conical scans of said infrared detector over said reference body and outer space.

13. The system as claimed in claim 1, wherein said detector is an infrared detector,
conical scan means incorporated in said common optical means for scanning said infrared detector over a reference body and outer space so as to produce signals from said infrared detector which are used to determine pitch and roll information of the orbiting body,
a carbon dioxide band filter interposed between said objective lens and said infrared detector having a central opening therein which applies radiation from said first and second cylindrical lenses directly on said infrared detector which produces such signals which are used to provide yaw attitude information such that the infared detector is used to provide pitch, roll and yaw attitude information.

* * * * *